UNITED STATES PATENT OFFICE.

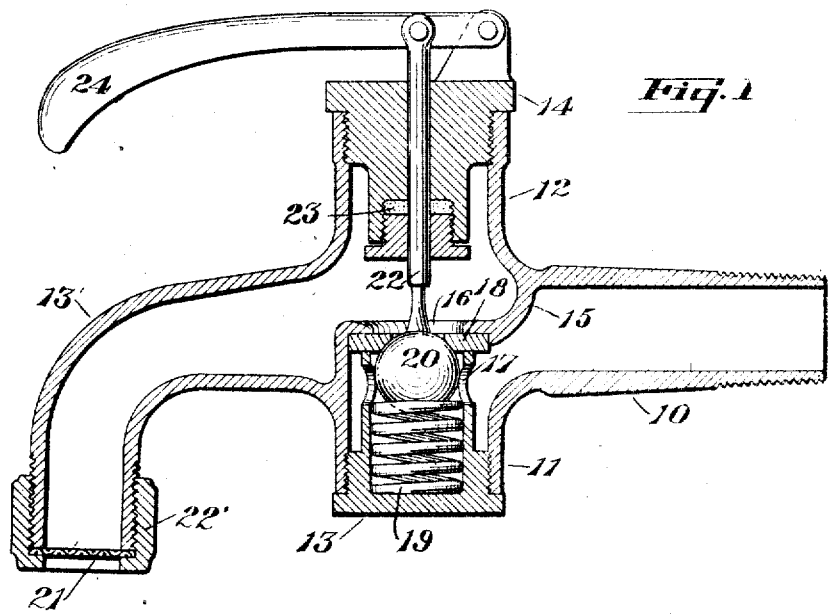
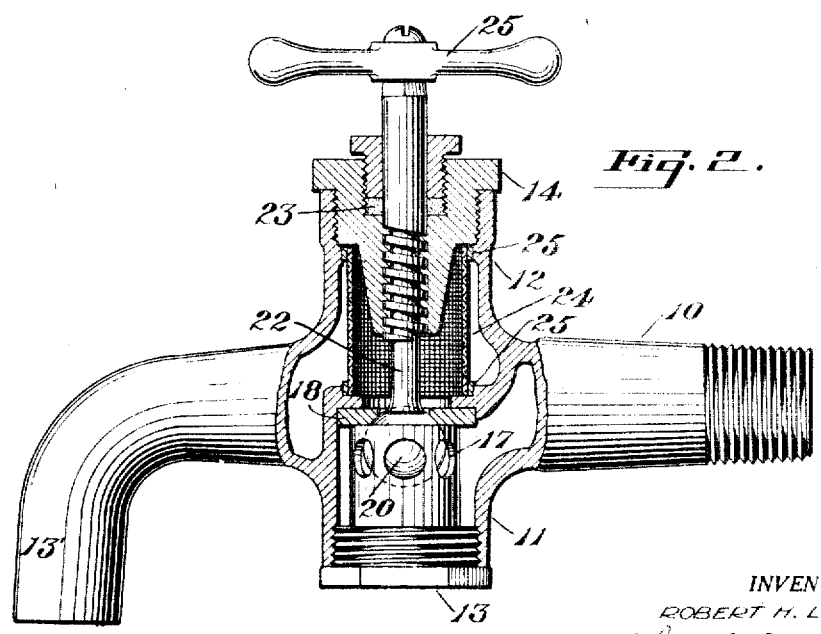

ROBERT H. LOCKYER, OF SAN FRANCISCO, CALIFORNIA.

FAUCET.

1,393,555.    Specification of Letters Patent.    Patented Oct. 11, 1921.

Application filed September 16, 1920. Serial No. 410,657.

*To all whom it may concern:*

Be it known that I, ROBERT HENRY LOCKYER, a citizen of the United States, residing at San Francisco, in the county of San Francisco and State of California, have invented new and useful Improvements in Faucets, of which the following is a specification.

This invention relates to faucets and has for its object to simplify and improve the construction and operation of such devices, more particularly to produce a structure of this character in which the parts likely to wear quickly may be readily and easily replaced without much expense.

Carrying out this object I employ a faucet which includes a ball valve carried in a cage, the latter being removably fitted into a pipe and carrying also a spring and a removable seat. A stem with suitable operating means is provided for depressing the ball to unseat the same and open the valve. The cage is screwed into place and can be readily removed for the purpose of replacing the seat or spring should either become worn.

In the accompanying drawing Figure 1 shows a sectional view of a faucet embodying my invention;

Fig. 2 shows a similar view partly in section of a modified form of the same.

The device here shown preferably comprises a pipe 10 having a downward lateral extension 11 and an upward lateral extension 12. A continuation of the pipe is formed from the extensions 11 and 12 to form a spout 13'. A cage 13 is screw-threaded into the extension 11, and a plug 14 is screw-threaded into the upper extension 12. Between these two extensions is an angular partition 15 formed with an opening 16. The cage 13 is cylindrical in form and has its walls provided with apertures 17. At the inner end of the cage is a removable seat 18 adapted to rest against the partition 15. Within the cage is a spring 19 and a ball 20, the latter coöperating with the seat and held in position thereagainst by the spring 19.

Coöperating with the ball 20 is a stem 22 which extends out through the plug 14 and is fitted with a suitable operating handle whereby the ball may be depressed to open the valve. In Fig. 1 I show this stem 22 as being slidably fitted within the plug 14 and having a packing 23 at its lower end to prevent leakage of water. The stem in this instance may be operated by a lever 24. In Fig. 2 the stem is shown as screw-threaded into the plug 14 and has a suitable handle 25 for turning the same.

If desired a filtering medium may be used. In Fig. 1 a fine mesh screen 21 is employed which is positioned over the mouth of the spout 13' and held in position by a screw cap 22'. The screw cap is provided with an opening in register with the outlet the spout through which water may pass.

Fig. 2 the filtering medium is disposed immediately over the valve. The filtering medium comprises a cylindrical screen 24 of fine mesh and preferably having a ring or band 25 secured at each end to reinforce the screen. An annular seat is formed in the partition 15 adapted to seat the end of the screen and the other end of the screen is adapted to be rigidly held within the extension 12. Either type of screens employed can be easily removed for cleaning. In Fig. 1 it is only necessary to remove the cap 22' and in the Fig. 2 the plug and stem may be removed and the screen 24 lifted out. The cleaning of either screen can be accomplished without cutting off the water supply to the faucet.

Normally the faucet will be closed by the action of the spring 19 upon the ball 20, and moreover the pressure of the water will be in a direction to assist in maintaining the ball seated. To open the faucet the stem 22 is depressed. Should the seat become worn or the spring 19 become weakened or broken these parts can be readily and easily replaced by unscrewing the cage 13. The seat 18 is preferably constructed of Babbitt metal and the ball may be made of brass or other non-rusting metal. The ball is not likely to wear out as it has a tendency to rotate and thus to distribute the wear evenly over its entire surface.

While I have shown and described my invention as used in connection with a water faucet, it is to be understood that I am not to be limited to this particular use. For instance I am aware of the fact that with slight modification my invention could be utilized as a valve in stopping and permitting the flow of a liquid or vapor in a pipe. Also it is to be understood that I am not to be limited to the specific form and arrangement shown, as indicated by the appended claims.

Having thus described my invention, what I claim and desire to secure by Letters Patent is—

1. In a faucet, a pipe having opposite laterally projecting extensions, an angular partition within the pipe between said extensions, a cage screw-threaded into one of said extensions and comprising an apertured cylindrical wall, a seat removably mounted on the inner end of the cage to fit against the partition within the pipe, a ball within the cage coöperating with the seat, a spring within the cage to press the ball into engagement with the seat, a plug screw-threaded into the other extension on the pipe, a stem extending through the plug and coöperating with the ball and means to actuate the stem whereby to depress the ball and unseat the same, the force of the spring combined with the pressure of the fluid in the pipe serving to press the ball tightly against the seat and thereby keeping the seat in close engagement with the partition.

2. In a faucet, a pipe having opposite laterally projecting extensions, a partition within the pipe between said extensions, a cage screw threaded into one of said extensions, and comprising an apertured cylindrical wall, a seat on the inner end of the cage to fit against the partition within the pipe, a ball within the cage, coöperating with the seat, a spring within the cage to press the ball into engagement with the seat, a plug screw threaded into the other extension on the pipe, a stem extending through the plug and coöperating with the ball, means to actuate the stem whereby to depress the ball and unseat the same, and a filtering medium in said last named extension extending between the plug and partition.

In testimony whereof I have hereunto set my hand in the presence of two subscribing witnesses.

ROBERT H. LOCKYER.

Witnesses:
JOHN H. HERRING,
WM. H. BAUER.